US008514715B2

(12) United States Patent
Jin et al.

(10) Patent No.: US 8,514,715 B2
(45) Date of Patent: Aug. 20, 2013

(54) CONGESTION WINDOW CONTROL BASED ON QUEUING DELAY AND PACKET LOSS

(75) Inventors: Cheng Jin, Los Angeles, CA (US); Victor Liu, Stanford, CA (US); Steven Low, La Canada, CA (US); Santosh Rao Gururajan, Arcadia, CA (US); Lingfeng Yang, Stanford, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 308 days.

(21) Appl. No.: 13/084,456

(22) Filed: Apr. 11, 2011

(65) Prior Publication Data
US 2011/0261691 A1 Oct. 27, 2011

Related U.S. Application Data

(60) Provisional application No. 61/326,985, filed on Apr. 22, 2010.

(51) Int. Cl.
*H04L 12/26* (2006.01)

(52) U.S. Cl.
USPC ........................................ 370/235

(58) Field of Classification Search
None
See application file for complete search history.

(56) References Cited

U.S. PATENT DOCUMENTS

| | | | |
|---|---|---|---|
| 7,706,261 B2* | 4/2010 | Sun et al. | 370/230 |
| 7,760,638 B2* | 7/2010 | Shimonishi et al. | 370/235 |
| 8,004,989 B2* | 8/2011 | Shimonishi | 370/235 |
| 8,379,515 B1* | 2/2013 | Mukerji | 370/229 |
| 2006/0029037 A1 | 2/2006 | Chen et al. | |
| 2006/0050640 A1 | 3/2006 | Jin et al. | |
| 2006/0114830 A1 | 6/2006 | Shimonishi et al. | |
| 2008/0095247 A1 | 4/2008 | Ohno et al. | |
| 2011/0249553 A1* | 10/2011 | Wang et al. | 370/230 |

OTHER PUBLICATIONS

Leith et al., "Experimental Evaluation of Delay/Loss-based TCP Congestion Control Algorithms," Proceedings of the 6th International Workshop on Protocols for Fast Long-Distance Networks, Mar. 2008, 6 pgs.

Liu et al., "TCP-Illinois: A Loss and Delay-Based Congestion Control Algorithm for High-Speed Networks," First International Conference on Performance Evaluation Methodologies and Tools, (Valuetools), Oct. 2006, 13 pgs.

(Continued)

*Primary Examiner* — Chirag Shah
*Assistant Examiner* — Amar Persaud
(74) *Attorney, Agent, or Firm* — Morgan, Lewis & Bockius LLP (57) ABSTRACT

A method of controlling size of a congestion window, includes, at a transmitting device, transmitting a plurality of data packets over a communication channel from the transmitting device to a receiver, determining a queuing delay and a loss rate of the transmission, comparing the queuing delay to a threshold queuing delay, comparing the loss rate to a threshold loss rate, and in response to a determination that the queuing delay is greater than the threshold queuing delay and the loss rate is greater than the threshold loss rate, resetting the size of the congestion window in accordance with a function of the current size of the congestion window, the queuing delay, and the loss rate, wherein at equilibrium the function generates a value inversely proportional to a weighted sum of an excess queuing delay and an excess loss rate.

12 Claims, 3 Drawing Sheets

(56) References Cited

OTHER PUBLICATIONS

Sridharan et al., "Compound TCP: A New TCP Congestion Control for High-Speed and Long Distance Networks," downloaded Aug. 1, 2011, 17 pgs., http://tools.ieft.org/html/draft-sridharan-tcpm-ctcp-00.

Tan et al., "A Compound TCP Approach for High-Speed and Long Distance Networks," Microsoft Corporation, One Microsoft Way, Redmond, WA, USA, Jul. 2005, 12 pgs.

Tang et al "Network Equilibrium of Heterogeneous Congestion Control Protocols," IEEE Infocom, Miami, Florida, Mar. 2005, p. 1338-1349.

Wu, "A Simulation Study of Compound TCP," School of Computing, National University of Singapore Computing 1, Law Link, Singapore 117590, Jul. 14, 2008, 2 pgs.

Fastsoft, Inc., PCT/US2011/033170, Apr. 20, 2011, International Search Report and Written Opinion mailed Aug. 2, 2011, 7 pgs.

\* cited by examiner

CONGESTION WINDOW CONTROL BASED ON QUEUING DELAY AND PACKET LOSS

RELATED APPLICATION

This application claims priority on U.S. Provisional Application Ser. No. 61/326,985, filed Apr. 22, 2010, which is incorporated herein by reference in its entirety.

TECHNICAL FIELD

The disclosed embodiments relate generally to transmitting data via communication networks. More particularly, the disclosed embodiments relate to controlling size of a congestion window utilized by a transmitting device.

BACKGROUND

Computer networks allow communication between one or more recipients. When the number of transmitters and receivers, and the amount of packet traffic, is greater than the network can efficiently handle (i.e., the network is congested), delay of transmission of packets to receivers and/or packet loss occurs. Congestion problems can be handled by adjusting the size of a congestion window, which corresponds to the amount of data that can be sent to a recipient before an acknowledgment is received, in accordance with network conditions.

SUMMARY

In order to maximize the amount of data transmitted to a receiver without overwhelming the network, the amount of data sent by a transmitting device to a receiver can be controlled by resetting (i.e., adjusting) the size of a congestion window in response to network conditions, including queuing delay and/or packet loss.

A method of controlling the size of a congestion window includes, at a transmitting device, transmitting a number of data packets over a communication channel from the transmitting device to a receiver, determining a queuing delay of the transmission, wherein the queuing delay corresponds to the difference of an average round trip time of the data packets and a base round trip time of the data packets, and determining a loss rate of the transmission, wherein the loss rate corresponds to the ratio of the number of data packets lost in the transmission to the number of data packets transmitted. The method further includes comparing the queuing delay to a threshold queuing delay and comparing the loss rate to a threshold loss rate. In response to a determination that the queuing delay is greater than the threshold queuing delay and the loss rate is less than the threshold loss rate, resetting the size of the congestion window in accordance with a first function of a current size of the congestion window and the queuing delay, wherein at equilibrium the first function generates a value inversely related to an excess queuing delay, which corresponds to the difference between the queuing delay and the threshold queuing delay. Further, in response to a determination that the queuing delay is less than the threshold queuing delay and the loss rate is greater than the threshold loss rate, resetting the size of the congestion window in accordance with a second function of the current size of the congestion window and the loss rate, wherein at equilibrium the second function generates a value inversely related to an excess loss rate, which corresponds to the difference between the loss rate and the threshold loss rate. And in response to a determination that the queuing delay is greater than the threshold queuing delay and the loss rate is greater than the threshold loss rate, resetting the size of the congestion window in accordance with a third function of the current size of the congestion window, the queuing delay, and the loss rate, wherein at equilibrium the third function generates a value inversely proportional to a weighted sum of the excess queuing delay and excess loss rate. In some embodiments, the weighted sum is a convex sum. A convex sum is a linear combination of values where all coefficients are non-negative and sum up to 1.

An apparatus for controlling the size of a congestion window includes a transceiver to transmit a plurality of packets over a communication channel to a receiver, one or more processors, and memory for storing instructions to be executed by the one or more processors. The stored instructions include instructions to determine a queuing delay of the transmission, wherein the queuing delay corresponds to the difference of an average round trip time of the data packets and a base round trip time of the data packets, determine a loss rate of the transmission, wherein the loss rate corresponds to the ratio of a number of data packets lost in the transmission to the number of data packets transmitted. The stored instructions further include: instructions to compare the queuing delay to a threshold queuing delay, and compare the loss rate to a threshold loss rate; and instructions to, in response to a determination that the queuing delay is greater than the threshold queuing delay and the loss rate is less than the threshold loss rate, reset the size of the congestion window in accordance with a first function of a current size of the congestion window and the queuing delay, wherein at equilibrium the first function generates a value inversely related to an excess queuing delay, which corresponds to the difference between the queuing delay and the threshold queuing delay. Further, the stored instructions include instructions to, in response to a determination that the queuing delay is less than the threshold queuing delay and the loss rate is greater than the threshold loss rate, reset the size of the congestion window in accordance with a second function of the current size of the congestion window and the loss rate, wherein at equilibrium the second function generates a value inversely related to an excess loss rate, which corresponds to the difference between the loss rate and the threshold loss rate. Additionally, the stored instructions include instructions to, in response to a determination that the queuing delay is greater than the threshold queuing delay and the loss rate is greater than the threshold loss rate, reset the size of the congestion window in accordance with a third function of the current size of the congestion window, the queuing delay, and the loss rate, wherein at equilibrium the third function generates a value inversely proportional to a weighted sum of the excess queuing delay and excess loss rate. In some embodiments, the weighted sum is a convex sum.

A computer readable storage medium, storing one or more programs for execution by one or more processor of an apparatus that includes a transceiver to transmit packets over a communication channel to a receiver is also disclosed. The one or more programs are for execution by the one or more processors of the apparatus so as to perform a method that includes transmitting a number of data packets over a communication channel from the transmitting device to a receiver, determining a queuing delay of the transmission, wherein the queuing delay corresponds to the difference of an average round trip time of the data packets and a base round trip time of the data packets, and determining a loss rate of the transmission, wherein the loss rate corresponds to the ratio of the number of data packets lost in the transmission to the number of data packets transmitted. The method also includes comparing the queuing delay to a threshold queuing delay and comparing the loss rate to a threshold loss rate. The method further includes, in response to a determination that the queuing delay is greater than the threshold queuing delay and the loss rate is less than the threshold loss rate, resetting the size of the congestion window in accordance with a first function of a current size of the congestion window and the queuing delay, wherein at equilibrium the first function generates a value inversely related to an excess queuing delay, which corresponds to the difference between the queuing delay and the threshold queuing delay. The method also includes, in response to a determination that the queuing delay is less than the threshold queuing delay and the loss rate is greater than the threshold loss rate, resetting the size of the congestion window in accordance with a second function of the current size of the congestion window and the loss rate, wherein at equilibrium the second function generates a value inversely related to an excess loss rate, which corresponds to the difference between the loss rate and the threshold loss rate. Additionally, the method includes, in response to a determination that the queuing delay is greater than the threshold queuing delay and the loss rate is greater than the threshold loss rate, resetting the size of the congestion window in accordance with a third function of the current size of the congestion window, the queuing delay, and the loss rate, wherein at equilibrium the third function generates a value inversely proportional to a weighted sum of the excess queuing delay and excess loss rate. In some embodiments, the weighted sum is a convex sum.

A method of controlling size of a congestion window includes, at a transmitting device, transmitting a plurality of data packets over a communication channel from the transmitting device to a receiver, determining a queuing delay of the transmission, wherein the queuing delay is the difference of an average round trip time of the data packets and a base round trip time of the data packets, determining a loss rate of the transmission, wherein the loss rate is the ratio of a number of data packets lost in the transmission to the number of data packets transmitted, determining an excess queuing delay, wherein excess queuing delay is the difference between the queuing delay and the threshold queuing delay, determining an excess loss rate, wherein excess loss rate is the difference between the loss rate and the threshold loss rate, comparing the queuing delay to a threshold queuing delay, comparing the loss rate to a threshold loss rate, and, in response to a determination that the queuing delay is greater than the threshold queuing delay and the loss rate is greater than the threshold loss rate, resetting the size of the congestion window in accordance with a function of the current size of the congestion window, the queuing delay, and the loss rate, wherein at equilibrium the function generates a value inversely proportional to a weighted sum of the excess queuing delay and excess loss rate. In some embodiments, the weighted sum is a convex sum.

An apparatus for controlling size of a congestion window includes a transceiver to transmit a plurality of packets over a communication channel to a receiver, one or more processors, and memory for storing instructions to be executed by the one or more processors. The stored instructions include instructions to transmit a plurality of data packets over a communication channel from the transmitting device to a receiver, determine a queuing delay of the transmission, wherein the queuing delay is the difference of an average round trip time of the data packets and a base round trip time of the data packets, determine a loss rate of the transmission, wherein the loss rate is the ratio of a number of data packets lost in the transmission to the number of data packets transmitted, determine an excess queuing delay, wherein excess queuing delay is the difference between the queuing delay and the threshold queuing delay, determine an excess loss rate, wherein excess loss rate is the difference between the loss rate and the threshold loss rate, compare the queuing delay to a threshold queuing delay, compare the loss rate to a threshold loss rate, and, in response to a determination that the queuing delay is greater than the threshold queuing delay and the loss rate is greater than the threshold loss rate, reset the size of the congestion window in accordance with a function of the current size of the congestion window, the queuing delay, and the loss rate, wherein at equilibrium the function generates a value inversely proportional to a weighted sum of the excess queuing delay and excess loss rate. In some embodiments, the weighted sum is a convex sum.

A computer readable storage medium, storing one or more programs for execution by one or more processor of an apparatus that includes a transceiver to transmit packets over a communication channel to a receiver is also disclosed. The one or more programs are for execution by the one or more processors of the apparatus so as to perform a method including transmitting a plurality of data packets over a communication channel from the transmitting device to a receiver, determining a queuing delay of the transmission, wherein the queuing delay is the difference of an average round trip time of the data packets and a base round trip time of the data packets, determining a loss rate of the transmission, wherein the loss rate is the ratio of a number of data packets lost in the transmission to the number of data packets transmitted, determining an excess queuing delay, wherein excess queuing delay is the difference between the queuing delay and the threshold queuing delay, determining an excess loss rate, wherein excess loss rate is the difference between the loss rate and the threshold loss rate, comparing the queuing delay to a threshold queuing delay, comparing the loss rate to a threshold loss rate, and, in response to a determination that the queuing delay is greater than the threshold queuing delay and the loss rate is greater than the threshold loss rate, resetting the size of the congestion window in accordance with a function of the current size of the congestion window, the queuing delay, and the loss rate, wherein at equilibrium the function generates a value inversely proportional to a weighted sum of the excess queuing delay and excess loss rate. In some embodiments, the weighted sum is a convex sum.

BRIEF DESCRIPTION OF THE DRAWINGS

Like reference numerals refer to corresponding parts throughout the drawings.

DESCRIPTION OF EMBODIMENTS

Figure 1:
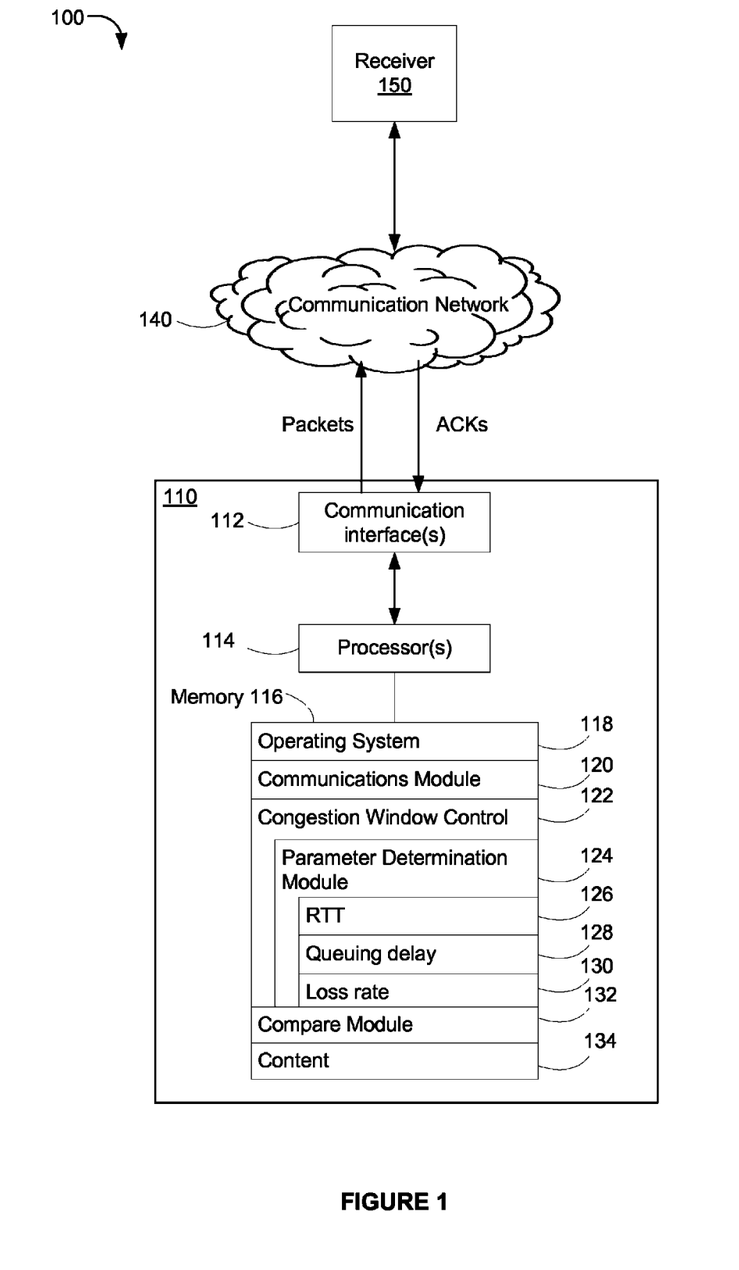
FIG. 1 is a block diagram illustrating a system for controlling the size of a congestion window in accordance with some embodiments of the present invention.

FIG. 1 is a block diagram illustrating a system 100 for controlling the size of a congestion window. A transmitting device 110 transmits packets to a receiver 150 via a communication network 140 in accordance with a congestion window cwnd (not shown). The transmitting device 110 also receives acknowledgment packets (ACKs) from the receiver 150 via the communication network 140. Transmitting device 110 may also be referred to herein as a transceiver, as it both transmits and receives information.

The congestion window cwnd corresponds to the amount of outstanding data (unacknowledged by the receiver 150) the transmitting device 110 can send on a particular connection before it gets acknowledgment packets (ACKs) back from the receiver 150. As described below, the size of the congestion window cwnd is dynamically adjusted in response to communication network 140 conditions.

The communication network 140 may be any local area network (LAN) and/or wide area network (WAN), such as an intranet, an extranet, the Internet, or a combination of such networks. It is sufficient that the communication network 140 provides communication capability between the transmitting device 110 and the receiver 150. In some embodiments, the communication network 140 transports packets using FAST Transmission Control Protocol (FAST TCP).

The transmitter 110 and the receiver 150 are both connected to the communication network 140 during transmission of packets between transmitter 110 and receiver 150. Receiver 150 receives and processes the packets transmitted by transmitting device 110. Receiver 150 also generates acknowledgment packets (ACKs) corresponding to each of the transmitted packets.

Transmitting device 110 typically includes one or more network or other communication interfaces 112, one or more processors 114, and memory 116.

Memory 116 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 116 may optionally include one or more storage devices remotely located from processor 114. Memory 116, or alternately the non-volatile memory device(s) within memory 116, comprises a computer readable storage medium. In some embodiments, memory 116 stores the following programs, modules and data structures, or a subset thereof:

- an operating system 118 that includes procedures for handling various basic system services and for performing hardware dependent tasks;
- a communications module 120 that is used for connecting the transmitting device 110 to a receiver 150 via the one or more communication interfaces 112 (wired or wireless) and one or more communication networks 140, such as the Internet, other wide area networks, local area networks, metropolitan area networks, and so on;
- a congestion window control module 122 that includes a parameter determination module 124;
- a compare module 132; and
- content 134, which includes data to be transmitted.

The parameter determination module 124 may include a round trip time (RTT) determination module 126, a queuing delay determination module 128, and a loss rate determination module 130.

The round trip time (RTT) determination module 126 determines a current round trip time value, RTT(t), for use by the congestion window control module 122 to control a size of the congestion window cwnd(t). Generally, RTT(t) is the time required for a transmitted packet to travel from the transmitting device 110 to the receiver 150 and for a corresponding ACK to travel back from the receiver 150 to the transmitting device 110.

The queuing delay determination module 128 determines a queuing delay q(t) for use by the congestion window control module 122 to control the size of the congestion window cwnd(t). Generally, queuing delay q(t) is the difference of an average RTT of the packets and a base RTT. The base RTT is the shortest RTT seen by the transmitting device 110 since the transmitting device 110 has transmitted packets on a particular connection.

The loss rate determination module 130 determines a current loss rate l(t) for use by the congestion window control module 122 to control the size of the congestion window cwnd(t). Generally, the current loss rate l(t) is the ratio of the number of data packets lost in the transmission to the number of data packets transmitted.

The congestion window control module 122 controls the size of the congestion window cwnd(t). In some embodiments, the congestion window control module 122 resets the size of the congestion window cwnd(t+1) in accordance with:

$$cwnd(t+1) = \left(1 - \lambda \frac{[q(t) - q_0]^+}{q(t) + d} - \bar{\lambda}[l(t) - l_0]^+ \right) cwnd(t) + \alpha \quad \text{(Eq. 1)}$$

wherein $\lambda \in (0,1)$ is a constant parameter, $q_0$ is a queuing delay threshold, d is an estimate of a round trip propagation delay and fixed processing time (usually set to the base RTT), $l_0$ is a packet loss threshold, and $\alpha$ is a parameter representing an equilibrium point for updates to the congestion window. The function $[x]^+ = \max(x, 0)$. In some embodiments, $\bar{\lambda} = 1 - \lambda$, and thus $\bar{\lambda} \in (0,1)$.

The congestion window control module 122 works to stabilize the size of the congestion window cwnd(t) such that the reset size of the congestion window cwnd(t+1) is equal to the current size of the congestion window cwnd(t) at equilibrium. In some embodiments, the size of the congestion window cwnd(t) is reset (i.e., recomputed, based on the most recently determined RTT(t), q(t), and l(t) values) once every round trip time. In other embodiments, the size of the congestion window cwnd(t) is reset periodically (e.g., every N milliseconds).

At equilibrium, when the size of the congestion window cwnd(t) is stabilized (i.e., cwnd(t+1)=cwnd(t)=cwnd), the congestion window control module 122 sets the size of the congestion window cwnd(t) in accordance with:

$$cwnd = \frac{\alpha}{\lambda[q - q_0]^+ / T + \bar{\lambda}[l - l_0]^+} \quad \text{(Eq. 2)}$$

where cwnd, q, and l are the equilibrium values of cwnd(t), q(t), and l(t), respectively, and T=q+d, which is the equilibrium round trip time, RTT.

At equilibrium, updates to the size of the congestion window settle into three regions: the delay region, where queuing delay dominates (i.e., $q > q_0$ and $l \leq l_0$); the loss region, where packet loss rate dominates (i.e., $q \leq q_0$ and $l > l_0$); and the weighted sum region, where both queuing delay and packet loss are significant (i.e., $q > q_0$ and $l > l_0$). The equilibrium congestion window cwnd size in each of these three regions is described by:

$$\text{Delay region: } cwnd = \frac{\alpha}{\lambda(q - q_0)/T} \text{ when } q > q_0 \text{ and } l \leq l_0 \quad \text{(Eq. 3)}$$

-continued $$\text{Loss region: } cwnd = \frac{\alpha}{\bar{\lambda}(l-l_0)} \text{ when } q \leq q_0 \text{ and } l > l_0 \quad \text{(Eq. 4)}$$

$$\text{Weighted sum region: } cwnd = \quad \text{(Eq. 5)}$$
$$\frac{\alpha}{\bar{\lambda}(q-q_0)/T + \bar{\lambda}(l-l_0)} \text{ when } q > q_0 \text{ and } l > l_0$$

Returning to FIG. 1, the compare module 132 compares the queuing delay q and a threshold queuing delay $q_0$. In some embodiments, the threshold queuing delay $q_0$ is set to a default parameter. In other embodiments, the threshold queuing delay $q_0$ is dependent upon network conditions (e.g., in some embodiments, $q_0$ is set to the minimum value of q observed, on the same communication channel, since the last time a reset or power on event occurred). The compare module 132 also compares loss rate l and a threshold loss rate $l_0$. In some embodiments, the threshold loss rate $l_0$ is set to a default parameter. In other embodiments, the threshold loss rate $l_0$ is dependent upon network conditions (e.g., in some embodiments, $l_0$ is set to the minimum value of l observed, on the same communication channel, since the last time a reset or power on event occurred).

As shown above, when the queuing delay q is greater than the threshold queuing delay $q_0$ and the loss rate l is less than or equal to the threshold loss rate $l_0$, the congestion control module 122 operates in the delay region and the size of the congestion window cwnd is reset in accordance with Eq. 3. As shown in Eq. 3, the cwnd reset function generates a cwnd equilibrium value inversely proportional to an excess queuing delay, which corresponds to a difference between the queuing delay q and the threshold queuing delay $q_0$, when the congestion control module 122 is operating in the delay region.

Further, when the queuing delay q is less than or equal to the threshold queuing delay $q_0$ and the loss rate l is greater than the threshold loss rate $l_0$, the congestion control module 122 operates in the loss region and the size of the congestion window cwnd is reset in accordance with Eq. 4. As shown in Eq. 4, the cwnd reset function generates a cwnd value inversely proportional to an excess loss rate, which corresponds to a difference between the loss rate l and the threshold loss rate $l_0$, when the congestion control module 122 is operating in the loss region.

Additionally, when the queuing delay q is greater than the threshold queuing delay $q_0$ and the loss rate l is greater than the threshold loss rate $l_0$, the congestion control module 122 operates in the weighted sum region and the size of the congestion window cwnd is reset in accordance with Eq. 5. As shown in Eq. 5, the cwnd reset function generates a cwnd value inversely proportional to a weighted sum of the excess queuing delay and the excess loss rate when the congestion control module 122 is operating in the weighted sum region. In some embodiments, the weighted sum (in the cwnd reset function, e.g., the cwnd reset function shown in Eq. 5) is a convex sum.

As stated above, the transmitting device 110 transmits packets to the receiver 150 in accordance with congestion window cwnd(t). Accordingly, after the congestion window cwnd(t) is reset, the transmitting device 110 transmits packets over communication channel 140 to the receiver 150 in accordance with the reset size of the congestion window cwnd(t).

Each of the above identified elements may be stored in one or more of the previously mentioned memory devices of transmitter 110. The applications, functions, modules, and operating system shown in FIG. 1 correspond to a set of instructions, stored in memory, for performing the functions described above. The set of instructions can be executed by the one or more processors 114 of transmitter 110. The above identified modules or programs (i.e., sets of instructions) need not be implemented as separate software programs, procedures or modules, and thus various subsets of these modules may be combined or otherwise re-arranged in various embodiments. In some embodiments, memory 116 or a computer readable storage medium of memory 116 stores a subset of the modules and data structures identified above. Furthermore, memory 116 or a computer readable storage medium of memory 116 may store additional modules and data structures not described above.

Although FIG. 1 shows a transmitting device 110, it is intended more as functional description of the various features which may be present in a transmitting device or transceiver. In practice, and as recognized by those of ordinary skill in the art, items shown separately could be combined and some items could be separated.

Figure 2:
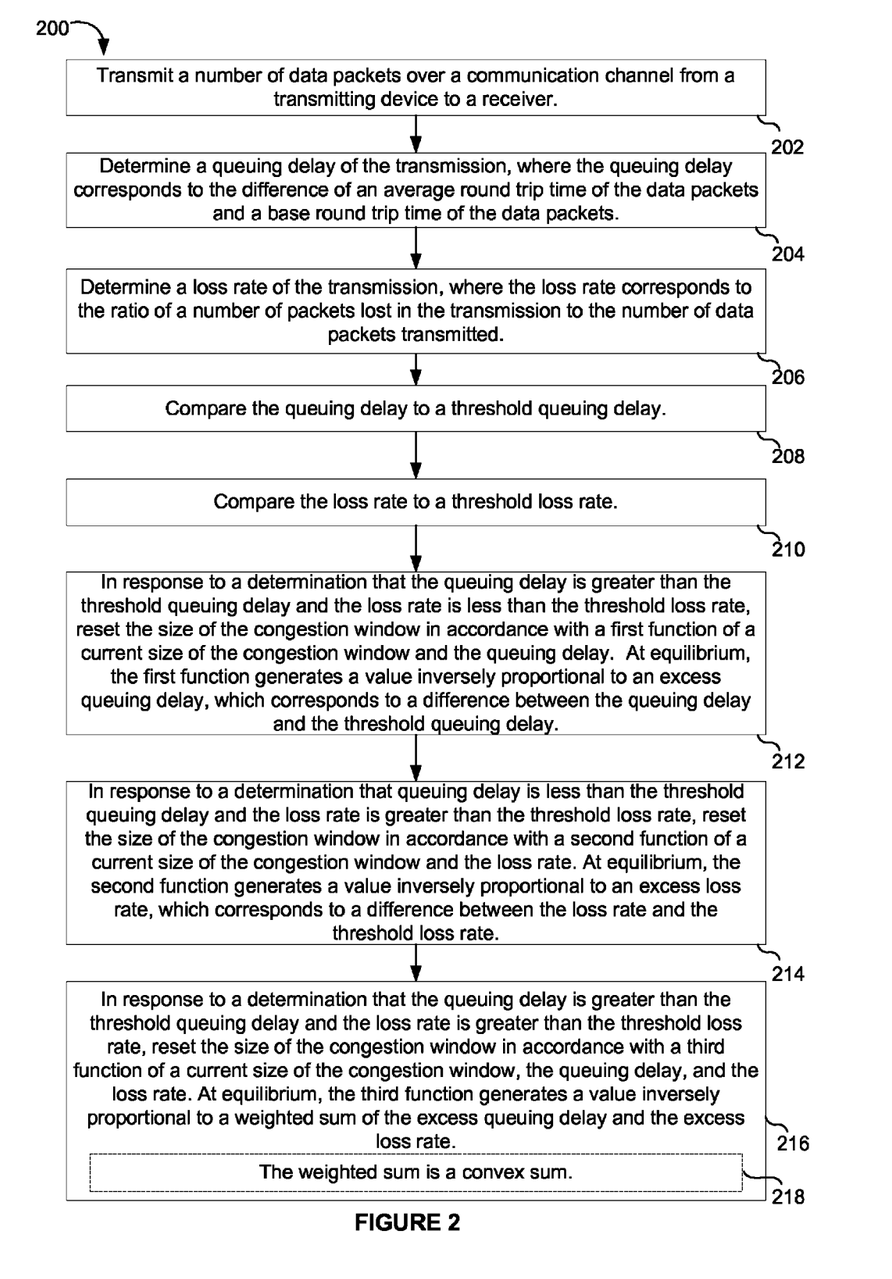
FIG. 2 is a flow diagram illustrating a process for controlling the size of a congestion window at a transmitting device in accordance with some embodiments of the present invention.

FIG. 2 is a flow chart of a method 200 for controlling size of a congestion window. The following operations are performed at a transmitting device (e.g., transmitting device 110 (FIG. 1)).

A number of data packets are transmitted over a communication channel (e.g., communication network 140 (FIG. 1)) from the transmitting device to a receiver (e.g., receiver 150 (FIG. 1)) (202).

A queuing delay (e.g., queuing delay q) of the transmission the transmission is determined (204). As discussed above in connection with FIG. 1, the queuing delay corresponds to the difference of an average round trip time of the data packets and a base round trip time of the data packets. As further described above in connection with FIG. 1, the round trip time is the time required for a transmitted packet to travel from the transmitting device to the receiver and ACKs to travel back.

A loss rate (e.g., loss rate l) of the transmission is also determined (206). As discussed above in connection with FIG. 1, the loss rate corresponds to the ratio of the number of data packets lost in the transmission to the number of data packets transmitted.

The method 200 further includes comparing the queuing delay to a threshold queuing delay (e.g., threshold queuing delay $q_0$) (208) and comparing the loss rate to a threshold loss rate (e.g., threshold loss rate $l_0$) (210).

In response to a determination that the queuing delay is greater than the threshold queuing delay and the loss rate is less than the threshold loss rate, the method 200 includes resetting the size of the congestion window in accordance with a first function of a current size of the congestion window and the queuing delay (212). At equilibrium, the first function (e.g., Eq. 3) generates a value inversely related to an excess queuing delay, which, as explained above in connection with FIG. 1, corresponds to the difference between the queuing delay and the threshold queuing delay.

In response to a determination that the queuing delay is less than the threshold queuing delay and the loss rate is greater than the threshold loss rate, the method 200 includes resetting the size of the congestion window in accordance with a second function of the current size of the congestion window and the loss rate (214). At equilibrium, the second function (e.g., Eq. 4) generates a value inversely related to an excess loss rate, which, as explained above in connection with FIG. 1, corresponds to the difference between the loss rate and the threshold loss rate.

In response to a determination that the queuing delay is greater than the threshold queuing delay and the loss rate is greater than the threshold loss rate, the method 200 includes resetting the size of the congestion window in accordance with a third function of the current size of the congestion window, the queuing delay, and the loss rate (216). At equilibrium, the third function (e.g., Eq. 5) generates a value inversely proportional to a weighted sum of the excess queuing delay and excess loss rate. In some embodiments, the weighted sum is a convex sum (218).

Figure 3:
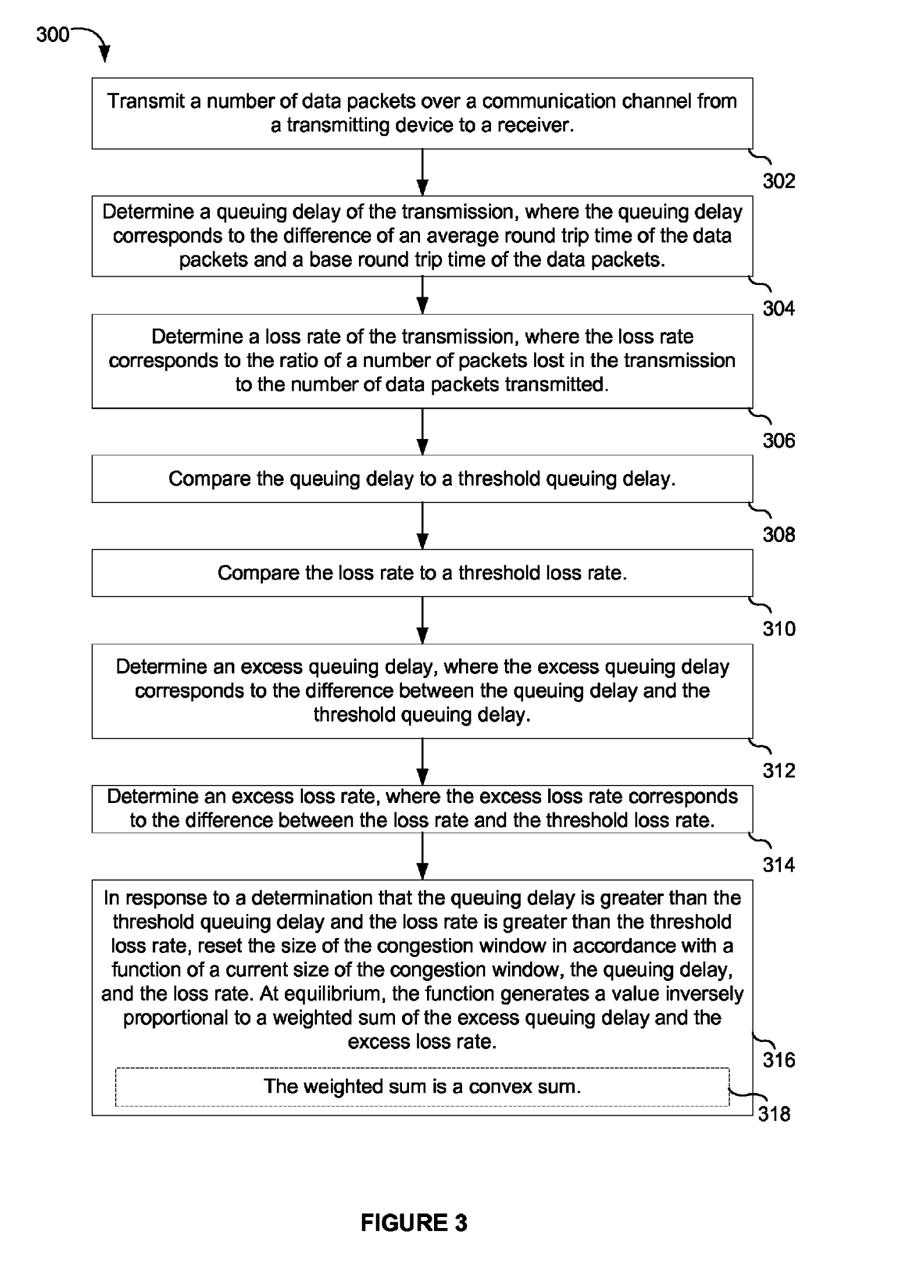
FIG. 3 is a flow diagram illustrating a process for controlling the size of a congestion window at a transmitting device in accordance with some embodiments of the present invention.

FIG. 3 is a flow chart of a method 300 for controlling size of a congestion window. The following operations are performed at a transmitting device (e.g., transmitting device 110 (FIG. 1)).

A plurality of data packets are transmitted over a communication channel (e.g., communication network 140 (FIG. 1)) from the transmitting device to a receiver (e.g., receiver 150 (FIG. 1)) (302).

A queuing delay (e.g., queuing delay q) of the transmission is determined (304). As discussed above in connection with FIG. 1, the queuing delay corresponds to the difference of an average round trip time of the data packets and a base round trip time of the data packets. As further described above in connection with FIG. 1, the round trip time is the time required for a transmitted packet to travel from the transmitting device to the receiver and the corresponding acknowledgement (ACK) to travel back.

A loss rate (e.g., loss rate l) of the transmission is determined (306). As discussed above in connection with FIG. 1, the loss rate corresponds to the ratio of the number of data packets lost in the transmission to the number of data packets transmitted.

The method 300 further includes comparing the queuing delay to a threshold queuing delay (e.g., threshold queuing delay $q_0$) (308) and comparing the loss rate to a threshold loss rate (e.g., threshold loss rate $l_0$) (310).

An excess queuing delay is determined (312). As discussed above in connection with FIG. 1, excess queuing delay is the difference between the queuing delay and the threshold queuing delay.

An excess loss rate is determined (314). As discussed above in connection with FIG. 1, excess loss rate is the difference between the loss rate and the threshold loss rate.

In response to a determination that the queuing delay is greater than the threshold queuing delay and the loss rate is greater than the threshold loss rate, method 300 includes resetting the size of the congestion window in accordance with a function of the current size of the congestion window, the queuing delay, and the loss rate (316). At equilibrium, the function (e.g., Eq. 5) generates a value (congestion window size) inversely proportional to a weighted sum of the excess queuing delay and excess loss rate. In some embodiments, the weighted sum is a convex sum (318).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of controlling size of a congestion window, comprising:
   at a transmitting device:
      transmitting a number of data packets over a communication channel from the transmitting device to a receiver;
      determining a queuing delay of the transmission, wherein the queuing delay corresponds to the difference of an average round trip time of the data packets and a base round trip time of the data packets;
      determining a loss rate of the transmission, wherein the loss rate corresponds to the ratio of a number of data packets lost in the transmission to the number of data packets transmitted;
      comparing the queuing delay to a threshold queuing delay;
      comparing the loss rate to a threshold loss rate;
      in response to a determination that the queuing delay is greater than the threshold queuing delay and the loss rate is less than the threshold loss rate, resetting the size of the congestion window in accordance with a first function of a current size of the congestion window and the queuing delay, wherein at equilibrium the first function generates a value inversely related to an excess queuing delay, which corresponds to the difference between the queuing delay and the threshold queuing delay;
      in response to a determination that the queuing delay is less than the threshold queuing delay and the loss rate is greater than the threshold loss rate, resetting the size of the congestion window in accordance with a second function of the current size of the congestion window and the loss rate, wherein at equilibrium the second function generates a value inversely related to an excess loss rate, which corresponds to the difference between the loss rate and the threshold loss rate;
      in response to a determination that the queuing delay is greater than the threshold queuing delay and the loss rate is greater than the threshold loss rate, resetting the size of the congestion window in accordance with a third function of the current size of the congestion window, the queuing delay, and the loss rate, wherein at equilibrium the third function generates a value inversely proportional to a weighted sum of the excess queuing delay and excess loss rate.

2. The method of claim 1, wherein the weighted sum is a convex sum.

3. An apparatus for controlling size of a congestion window, the apparatus comprising:
   a transceiver to transmit a plurality of packets over a communication channel to a receiver;
   one or more processors; and
   memory for storing instructions to be executed by the one or more processors, the stored instructions to:
      determine a queuing delay of the transmission, wherein the queuing delay corresponds to the difference of an average round trip time of the data packets and a base round trip time of the data packets;
      determine a loss rate of the transmission, wherein the loss rate corresponds to the ratio of a number of data packets lost in the transmission to the number of data packets transmitted;
      compare the queuing delay to a threshold queuing delay;
      compare the loss rate to a threshold loss rate;
      in response to a determination that the queuing delay is greater than the threshold queuing delay and the loss rate is less than the threshold loss rate, reset the size of the congestion window in accordance with a first function of a current size of the congestion window and the queuing delay, wherein at equilibrium the first function generates a value inversely related to an excess queuing delay, which corresponds to the difference between the queuing delay and the threshold queuing delay;

in response to a determination that the queuing delay is less than the threshold queuing delay and the loss rate is greater than the threshold loss rate, reset the size of the congestion window in accordance with a second function of the current size of the congestion window and the loss rate, wherein at equilibrium the second function generates a value inversely related to an excess loss rate, which corresponds to the difference between the loss rate and the threshold loss rate;

in response to a determination that the queuing delay is greater than the threshold queuing delay and the loss rate is greater than the threshold loss rate, reset the size of the congestion window in accordance with a third function of the current size of the congestion window, the queuing delay, and the loss rate, wherein at equilibrium the third function generates a value inversely proportional to a weighted sum of the excess queuing delay and excess loss rate.

4. The apparatus of claim 3, wherein the weighted sum is a convex sum.

5. A non-transitory computer readable storage medium, storing one or more programs for execution by one or more processor of an apparatus that includes a transceiver to transmit packets over a communication channel to a receiver;

wherein the one or more programs are for execution by the one or more processors of the apparatus so as to perform a method comprising:

transmitting a number of data packets over a communication channel from the transmitting device to a receiver;

determining a queuing delay of the transmission, wherein the queuing delay corresponds to the difference of an average round trip time of the data packets and a base round trip time of the data packets;

determining a loss rate of the transmission, wherein the loss rate corresponds to the ratio of a number of data packets lost in the transmission to the number of data packets transmitted;

comparing the queuing delay to a threshold queuing delay;

comparing the loss rate to a threshold loss rate;

in response to a determination that the queuing delay is greater than the threshold queuing delay and the loss rate is less than the threshold loss rate, resetting the size of the congestion window in accordance with a first function of a current size of the congestion window and the queuing delay, wherein at equilibrium the first function generates a value inversely related to an excess queuing delay, which corresponds to the difference between the queuing delay and the threshold queuing delay;

in response to a determination that the queuing delay is less than the threshold queuing delay and the loss rate is greater than the threshold loss rate, resetting the size of the congestion window in accordance with a second function of the current size of the congestion window and the loss rate, wherein at equilibrium the second function generates a value inversely related to an excess loss rate, which corresponds to the difference between the loss rate and the threshold loss rate;

in response to a determination that the queuing delay is greater than the threshold queuing delay and the loss rate is greater than the threshold loss rate, resetting the size of the congestion window in accordance with a third function of the current size of the congestion window, the queuing delay, and the loss rate, wherein at equilibrium the third function generates a value inversely proportional to a weighted sum of the excess queuing delay and excess loss rate.

6. The non-transitory computer readable storage medium of claim 2, wherein the weighted sum is a convex sum.

7. A method of controlling size of a congestion window, comprising:

at a transmitting device:

transmitting a plurality of data packets over a communication channel from the transmitting device to a receiver;

determining a queuing delay of the transmission, wherein the queuing delay corresponds to the difference of an average round trip time of the data packets and a base round trip time of the data packets;

determining a loss rate of the transmission, wherein the loss rate corresponds to the ratio of a number of data packets lost in the transmission to the number of data packets transmitted;

comparing the queuing delay to a threshold queuing delay;

comparing the loss rate to a threshold loss rate;

determining an excess queuing delay, wherein excess queuing delay corresponds to the difference between the queuing delay and the threshold queuing delay;

determining an excess loss rate, wherein excess loss rate corresponds to the difference between the loss rate and the threshold loss rate;

in response to a determination that the queuing delay is greater than the threshold queuing delay and the loss rate is greater than the threshold loss rate, resetting the size of the congestion window in accordance with a function of the current size of the congestion window, the queuing delay, and the loss rate, wherein at equilibrium the function generates a value inversely proportional to a weighted sum of the excess queuing delay and excess loss rate.

8. The method of claim 7, wherein the weighted sum is a convex sum.

9. An apparatus for controlling size of a congestion window, the apparatus comprising:

a transceiver to transmit a plurality of packets over a communication channel to a receiver;

one or more processors; and memory for storing instructions to be executed by the one or more processors, the stored instructions to:

transmit a plurality of data packets over a communication channel from the transmitting device to a receiver;

determine a queuing delay of the transmission, wherein the queuing delay corresponds to the difference of an average round trip time of the data packets and a base round trip time of the data packets;

determine a loss rate of the transmission, wherein the loss rate corresponds to the ratio of a number of data packets lost in the transmission to the number of data packets transmitted;

compare the queuing delay to a threshold queuing delay;

compare the loss rate to a threshold loss rate;

determine an excess queuing delay, wherein excess queuing delay corresponds to the difference between the queuing delay and the threshold queuing delay;

determine an excess loss rate, wherein excess loss rate corresponds to the difference between the loss rate and the threshold loss rate;

in response to a determination that the queuing delay is greater than the threshold queuing delay and the loss rate is greater than the threshold loss rate, reset the size of the congestion window in accordance with a function of the current size of the congestion window, the queuing delay, and the loss rate, wherein at equilibrium the function generates a value inversely proportional to a weighted sum of the excess queuing delay and excess loss rate.

10. The apparatus of claim 9, wherein the weighted sum is a convex sum.

11. A non-transitory computer readable storage medium, storing one or more programs for execution by one or more processor of an apparatus that includes a transceiver to transmit packets over a communication channel to a receiver;
wherein the one or more programs are for execution by the one or more processors of the apparatus so as to perform a method comprising:
transmitting a plurality of data packets over a communication channel from the transmitting device to a receiver;
determining a queuing delay of the transmission, wherein the queuing delay corresponds to the difference of an average round trip time of the data packets and a base round trip time of the data packets;
determining a loss rate of the transmission, wherein the loss rate corresponds to the ratio of a number of data packets lost in the transmission to the number of data packets transmitted;
comparing the queuing delay to a threshold queuing delay;
comparing the loss rate to a threshold loss rate;
determining an excess queuing delay, wherein excess queuing delay corresponds to the difference between the queuing delay and the threshold queuing delay;
determining an excess loss rate, wherein excess loss rate corresponds to the difference between the loss rate and the threshold loss rate;
in response to a determination that the queuing delay is greater than the threshold queuing delay and the loss rate is greater than the threshold loss rate, resetting the size of the congestion window in accordance with a function of the current size of the congestion window, the queuing delay, and the loss rate, wherein at equilibrium the function generates a value inversely proportional to a weighted sum of the excess queuing delay and excess loss rate.

12. The non-transitory computer readable storage medium of claim 11, wherein the weighted sum is a convex sum.

* * * * *